(12) United States Patent
Malla et al.

(10) Patent No.: US 12,741,629 B2
(45) Date of Patent: Sep. 22, 2026

(54) AUTOMATIC COORDINATED CONTROL OF VEHICLE AND WINCH

(71) Applicants: Hyundai Motor Company, Seoul (KR); Kia Corporation, Seoul (KR)

(72) Inventors: Rijan Malla, Superior Township, MI (US); Brian Link, Webster Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 112 days.

(21) Appl. No.: 18/771,294

(22) Filed: Jul. 12, 2024

(65) Prior Publication Data

US 2026/0014974 A1 Jan. 15, 2026

(51) Int. Cl.
*B60W 10/30* (2006.01)

(52) U.S. Cl.
CPC ......... *B60W 10/30* (2013.01); *B60W 2520/10* (2013.01); *B60W 2520/14* (2013.01); *B60W 2520/28* (2013.01)

(58) Field of Classification Search
CPC ......... B60W 10/06; B60W 2510/1005; B60W 30/18172; B60W 10/08; B60W 10/18; B60W 2520/26; B60W 2540/12; B60W 2710/083; B60W 2710/0666; B60W 10/04; B60W 2030/1809; B60W 2300/15; B60W 2300/17; B60W 2520/263; B60W 2720/26; B66D 1/12; B66D 1/22; B66D 1/40; B66D 3/006; B60K 6/52
See application file for complete search history.

(56) References Cited

U.S. PATENT DOCUMENTS

| | | | | |
|---|---|---|---|---|
| 4,216,843 A * | 8/1980 | Fukata | ................... | B60K 17/34 180/245 |
| 11,677,258 B2 | 6/2023 | Ehlert et al. | | |
| 2001/0054520 A1* | 12/2001 | Hosomi | .................. | B60T 8/175 180/197 |
| 2008/0194384 A1* | 8/2008 | League | ................. | F16H 61/061 477/130 |
| 2020/0317182 A1* | 10/2020 | Saha | ..................... | E02F 9/2066 |

(Continued)

FOREIGN PATENT DOCUMENTS

| | | | |
|---|---|---|---|
| GB | 2361897 A * | 11/2001 | ......... B60K 23/0808 |
| GB | 2515453 A | 12/2014 | |

(Continued)

*Primary Examiner* — Hunter B Lonsberry
*Assistant Examiner* — Henry R Hinton
(74) *Attorney, Agent, or Firm* — Fox Rothschild LLP

(57) ABSTRACT

A winching control system and method for controlling a winching control system are provided. The winching control system may comprise a vehicle, comprising one or more front wheels and one or more rear wheels, one or more front axles and one or more rear axles, one or more powertrains, one or more braking mechanisms, and a steering mechanism. The winching control system may comprise a winch, coupled to the vehicle, comprising a winching cable, and a computing device, comprising a processor and a memory. The memory may comprise instructions that, when executed by the processor, are configured to cause the processor to control the vehicle and the winch, and cause the winching control system function between a first mode of operation, a second mode of operation, and a third mode of operation.

14 Claims, 8 Drawing Sheets

(56) References Cited

U.S. PATENT DOCUMENTS

| | | | | |
|---|---|---|---|---|
| 2022/0144338 | A1* | 5/2022 | Scheuerell | B60T 8/1755 |
| 2022/0258603 | A1* | 8/2022 | Hiroi | B60K 5/04 |
| 2024/0217787 | A1* | 7/2024 | Mattson | B66D 1/36 |
| 2026/0001539 | A1* | 1/2026 | Mutchler | B60W 30/143 |

FOREIGN PATENT DOCUMENTS

| | | | | | |
|---|---|---|---|---|---|
| GB | 2530930 | A | * | 4/2016 | B66D 1/505 |
| GB | 2530930 | B | * | 8/2017 | B62D 57/04 |

* cited by examiner

AUTOMATIC COORDINATED CONTROL OF VEHICLE AND WINCH

BACKGROUND

Technical Field

Embodiments of the present disclosure relate to systems and methods for performing automatic control of a vehicle winch.

Background

Many vehicles comprised a winching system. A winch may be configured to enable recovery of a vehicle stuck in degraded traction condition (e.g., deep sand, water, a ditch, snow, rough terrain, etc.). A winch may also be configured to enable off-road drivers to explore extreme and remote terrain conditions with peace-of-mind where towing availability is limited. Currently, original equipment manufacturers do not offer vehicles with integrated winching systems. However, aftermarket winches are available that operate with a switch.

Most often, when operating a winch, a connection point from which to winch (e.g., a post, a tree, etc.) is not available directly in front of a stuck vehicle. Winching with a winch line angle (i.e., an angle from the vehicle's centerline) may rotate the vehicle undesirably, and the vehicle may not generate momentum in the desired direction to recover the vehicle from degraded traction condition optimally.

Additionally, winching, in many scenarios, may also require an additional person outside the vehicle to assess the slipping tires and provide navigation to the driver to steer.

Currently, drivers must operate the winch and the vehicle independently and no integrated winching solution exists that operates the winch and the vehicle in an automatic coordinated fashion.

SUMMARY

According to an object of the present disclosure, a winching control system is provided. The winching control system may comprise a vehicle, comprising one or more front wheels and one or more rear wheels, one or more front axles and one or more rear axles, one or more powertrains, one or more braking mechanisms, and a steering mechanism. The winching control system may comprise a winch, coupled to the vehicle, comprising a winching cable, and a computing device, comprising a processor and a memory. The memory may comprise instructions that, when executed by the processor, are configured to cause the processor to control the vehicle and the winch, and cause the winching control system function between a first mode of operation, a second mode of operation, and a third mode of operation.

According to an exemplary embodiment, in the first mode of operation, the winch may be deactivated and the vehicle may be configured to be driven by the one or more powertrains.

According to an exemplary embodiment, the instructions, when executed by the processor, may be further configured to cause the processor to activate the first mode of operation when a wheel speed difference between the one or more front axles and the one or more rear axles is less than a threshold value and a vehicle speed is greater than a threshold vehicle speed.

According to an exemplary embodiment, the winching control system may further comprise one or more sensors configured to determine whether any of the one or more front wheels and one or more rear wheels have a wheel slip.

According to an exemplary embodiment, in the second mode of operation, the winch may be activated with a winch gear engaged, the one or more powertrains may be activated, and the one or more braking mechanisms may be applied to any wheels having a wheel slip.

According to an exemplary embodiment, in the second mode of operation, the instructions, when executed by the processor, may be further configured to cause the processor to adjust a torque of the one or more powertrains. According to an exemplary embodiment, the adjusting the torque of the one or more powertrains may comprise determining, using the computing device, whether a rotational velocity of the winch is less than a threshold rotational velocity, when the rotational velocity of the winch is less than the threshold rotational velocity, engaging the winch at a low gear, and, when the rotational velocity of the vehicle is not less than the threshold rotational velocity, engaging the winch at a high gear.

According to an exemplary embodiment, the instructions, when executed by the processor, may be further configured to cause the processor to activate the second mode of operation when a wheel speed difference between the one or more front axles and the one or more rear axles is greater than a threshold value, a vehicle speed is less than a threshold vehicle speed, and an absolute value of a yaw rate of the vehicle is less than a threshold yaw rate value.

According to an exemplary embodiment, in the third mode of operation the winch may be activated with a winch gear engaged, the one or more powertrains may be activated, the one or more braking mechanisms may be applied to any wheels having a wheel slip, and the steering mechanism may be activated to control rotation of the vehicle.

According to an exemplary embodiment, in the third mode of operation, the instructions, when executed by the processor, may be further configured to cause the processor to adjust a torque of the one or more powertrains. According to an exemplary embodiment, the adjusting the torque of the one or more powertrains may comprise determining, using the computing device, whether a rotational velocity of the winch is less than a threshold rotational velocity, when the rotational velocity of the winch is less than the threshold rotational velocity, engaging the winch at a low gear, and, when the rotational velocity of the vehicle is not less than the threshold rotational velocity, engaging the winch at a high gear.

According to an exemplary embodiment, the instructions, when executed by the processor, may be further configured to cause the processor to activate the third mode of operation when a wheel speed difference between the one or more front axles and the one or more rear axles is greater than a threshold value, a vehicle speed is less than a threshold vehicle speed, and an absolute value of a yaw rate of the vehicle is greater than a threshold yaw rate value.

According to an object of the present disclosure, a method for controlling a winching control system is provided. The method may comprise, using a computing device, comprising a processor and a memory, controlling one or more functions of a vehicle and a winch of a winching control system. The vehicle may comprise one or more front wheels and one or more rear wheels, one or more front axles and one or more rear axles, one or more powertrains, one or more braking mechanisms, and a steering mechanism. The winch may be coupled to the vehicle and may comprise a winching cable. The method may comprise, using the computing device, causing the winching control system function between a first mode of operation, a second mode of operation, and a third mode of operation.

According to an exemplary embodiment, in the first mode of operation, the winch may be deactivated and the vehicle may be configured to be driven by the one or more powertrains.

According to an exemplary embodiment, the method may further comprise, using the computing device, activating the first mode of operation when a wheel speed difference between the one or more front axles and the one or more rear axles is less than a threshold value and a vehicle speed is greater than a threshold vehicle speed.

According to an exemplary embodiment, the method may further comprise determining, using one or more sensors, whether any of the one or more front wheels and one or more rear wheels have a wheel slip.

According to an exemplary embodiment, in the second mode of operation the winch may be activated with a winch gear engaged, the one or more powertrains may be activated, and the one or more braking mechanisms may be applied to any wheels having a wheel slip.

According to an exemplary embodiment, the method may further comprise, in the second mode of operation, using the computing device, adjusting a torque of the one or more powertrains. According to an exemplary embodiment, the adjusting the torque of the one or more powertrains may comprise determining, using the computing device, whether a rotational velocity of the winch is less than a threshold rotational velocity, when the rotational velocity of the winch is less than the threshold rotational velocity, engaging the winch at a low gear, and, when the rotational velocity of the vehicle is not less than the threshold rotational velocity, engaging the winch at a high gear.

According to an exemplary embodiment, the method may further comprise, using the computing device, activating the second mode of operation when a wheel speed difference between the one or more front axles and the one or more rear axles is greater than a threshold value, a vehicle speed is less than a threshold vehicle speed, and an absolute value of a yaw rate of the vehicle is less than a threshold yaw rate value.

According to an exemplary embodiment, in the third mode of operation, the winch may be activated with a winch gear engaged, the one or more powertrains may be activated, the one or more braking mechanisms may be applied to any wheels having a wheel slip, and the steering mechanism may be activated to control rotation of the vehicle.

According to an exemplary embodiment, the method may further comprise, in the third mode of operation, using the computing device, adjusting a torque of the one or more powertrains. According to an exemplary embodiment, the adjusting the torque of the one or more powertrains may comprise determining, using the computing device, whether a rotational velocity of the winch is less than a threshold rotational velocity, when the rotational velocity of the winch is less than the threshold rotational velocity, engaging the winch at a low gear, and, when the rotational velocity of the vehicle is not less than the threshold rotational velocity, engaging the winch at a high gear.

According to an exemplary embodiment, the method may further comprise, using the computing device, activating the third mode of operation when a wheel speed difference between the one or more front axles and the one or more rear axles is greater than a threshold value, a vehicle speed is less than a threshold vehicle speed, and an absolute value of a yaw rate of the vehicle is greater than a threshold yaw rate value.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figures 1, 2:
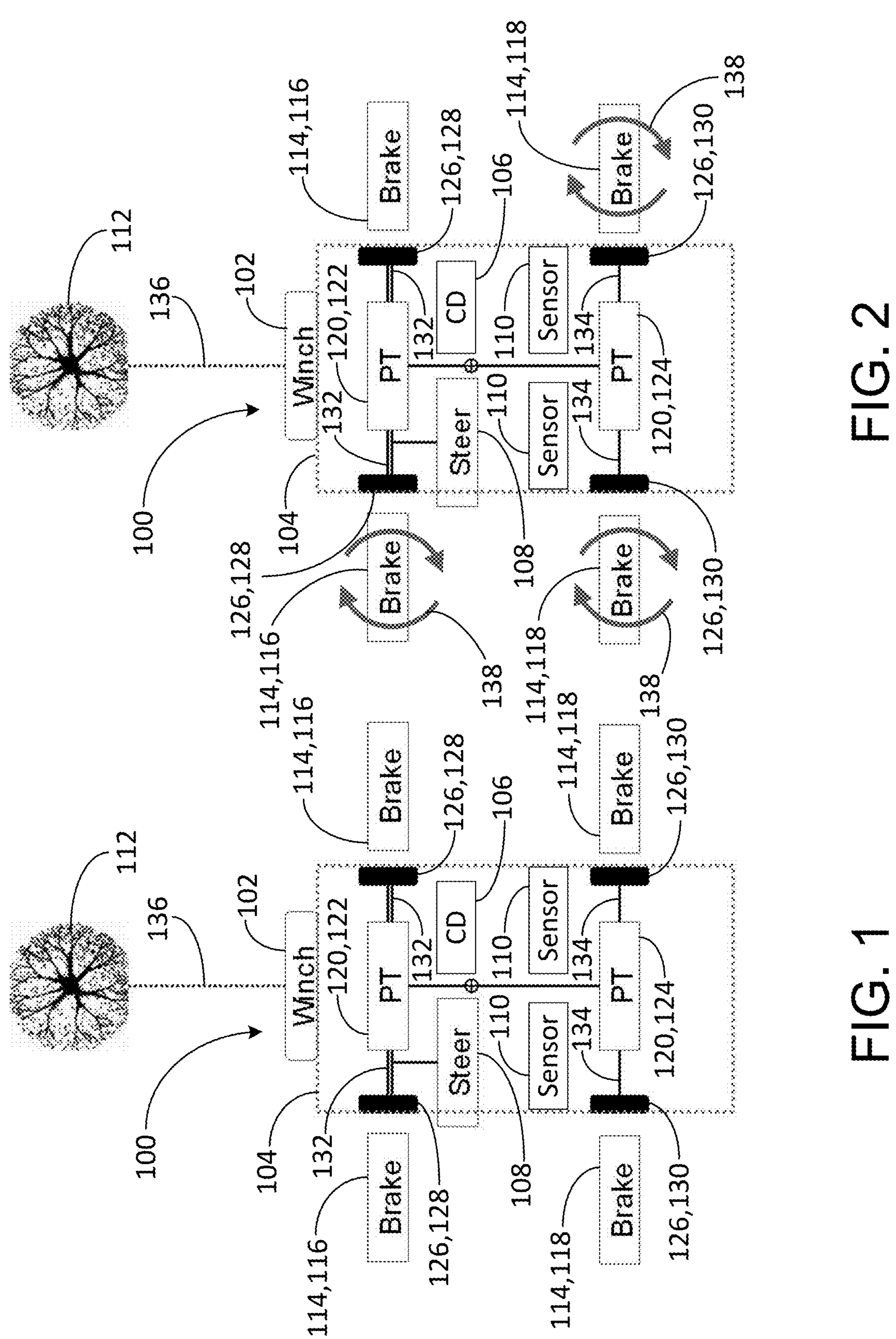
FIG. 1 illustrates a winching control system functioning in accordance with a first mode of operation, according to an exemplary embodiment of the present disclosure.
FIG. 2 illustrates a winching control system functioning in accordance with a second mode of operation, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving." "controlling." "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to exemplary embodiments, a winching system integrated with vehicle control is provided.

Figure 3:
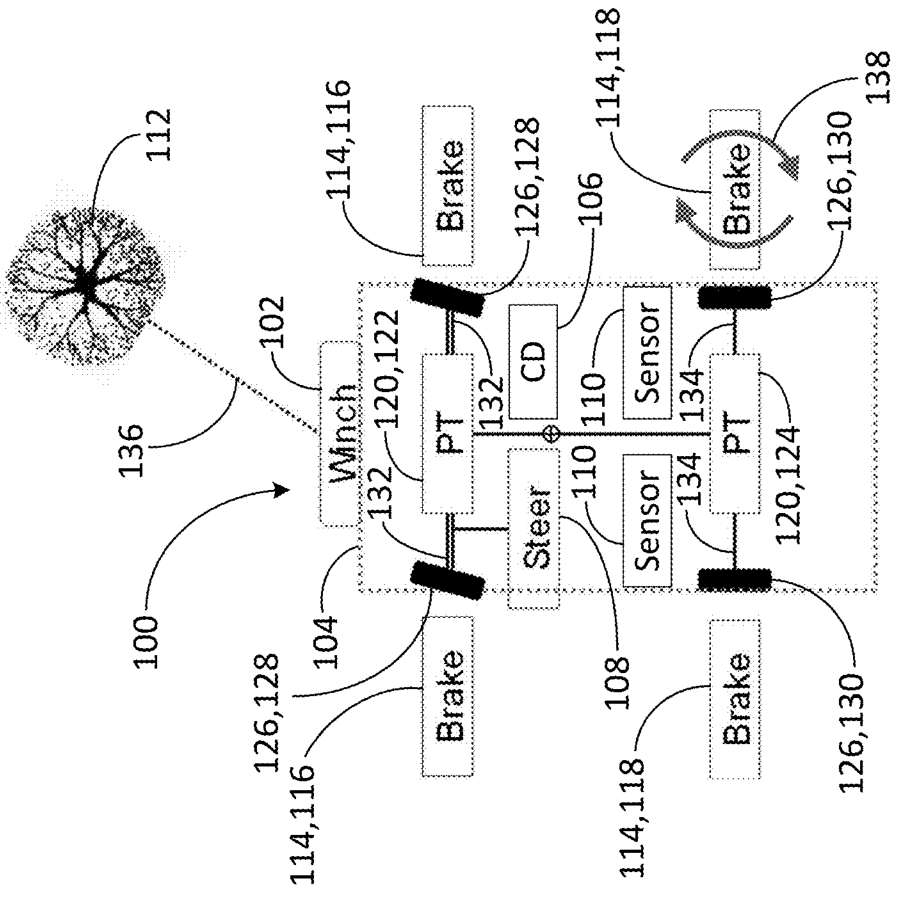
FIG. 3 illustrates a winching control system functioning in accordance with a third mode of operation, according to an exemplary embodiment of the present disclosure.

Referring now to FIGS. 1-3, a winching control system 100 is illustratively depicted in a first mode of operation (FIG. 1), a second mode of operation (FIG. 2), and a third mode of operation (FIG. 3), in accordance with exemplary embodiments of the present disclosure.

According to an exemplary embodiment, the winching control system may comprise a winch 102 and a vehicle 104. The winch 102 may comprise a winching cable 136 and/or connection device (e.g., a hook or other suitable connection device) configured to be secured to a stationary object 112 (e.g., a tree, poll, and/or other suitable stationary object) and configured to spool at a spooling location on the wince 102. According to an exemplary embodiment, the winch 102 may comprise one or more motors configured to spool the winching cable 136.

The vehicle 104 may comprise one or more braking mechanisms 114 (e.g., one or more front braking mechanisms 116 and/or one or more rear braking mechanisms 118), a steering mechanism 108, a plurality of wheels 126 (e.g., one or more front wheels 128 and/or one or more rear wheels 130), and a powertrain 120 (e.g., a front powertrain 122 and/or a rear powertrain 124).

According to an exemplary embodiment, the winching control system 100 may comprise one or more computing devices 106. The one or more computing devices 106 may be configured to function as both a winching control (controlling the winch 102) and a vehicle control (controlling the vehicle 104) such that, when an accelerator (e.g., an acceleration pedal) is applied, both the winch 102 and the vehicle 104 are controlled appropriately by the powertrain 120 (e.g., a front powertrain 122 and/or a rear powertrain 124).

According to an exemplary embodiment, the one or more computing devices 106 may be configured to monitor a vehicle 104 yaw rate and winch 102 motor speed, via one or more sensors 110, while controlling driving, braking, and steering of the vehicle 104 to provide an energy optimal and efficient winching function to recover the vehicle 104 from one or more degraded traction conditions. According to an exemplary embodiment, the one or more sensors 110 may comprise one or more accelerometers, one or more position sensors, one or more roll, pitch, and/or yaw angle data sensors, one or more wheel slippage sensors, one or more winch speed sensors, one or more inertial measurement unit sensors, one or more wheel speed sensors, and/or other suitable sensors.

According to an exemplary embodiment, the winching control system 100 may comprise a winch gear. The winch gear may be configured to be automatically shifted based on motor speed and load demand based on one or more use scenarios.

According to an exemplary embodiment, the winching control system 100 may be configured to recover the vehicle 104 from one or more degraded traction conditions without the need of one or more additional people and extensive recovery experience, enabling energy efficient, cost efficient, and time efficient recovery of the vehicle 104.

According to an exemplary embodiment, when the winching control system 100 is functioning in accordance with the first mode of operation (as shown, e.g., in FIG. 1), the winch 102 may be turned off (i.e., deactivated), the vehicle 102 may be set to be driven by the powertrain 120.

According to an exemplary embodiment, the first mode of operation may be activated when a wheel 126 speed difference between one or more front axles 132 and one or more rear axles 134 is less than a threshold value and a vehicle 104 speed is greater than a threshold vehicle speed value.

According to an exemplary embodiment, when the winching control system 100 is functioning in accordance with the second mode of operation (as shown, e.g., in FIG. 2), the winch 102 may be turned on and active, an appropriate winch gear may be engaged (depending on winch 102 speed and torque demand), the powertrain 120 may be active and the powertrain 120 torque may be adjusted and applied, and the braking mechanisms 114 may be applied to any wheels 126 having a wheel slip 138.

According to an exemplary embodiment, the second mode of operation may be activated when a wheel speed difference between one or more front axles 132 and one or more rear axles 134 is greater than a threshold value, a vehicle 104 speed is less than the threshold vehicle 104 speed value for the first mode of operation, and an absolute value of a yaw rate of the vehicle 104 is less than a threshold yaw rate value.

According to an exemplary embodiment, when the winching control system 100 is functioning in accordance with the third mode of operation (as shown, e.g., in FIG. 3), the winch 102 may be turned on and active, an appropriate winch gear may be engaged (depending on winch 102 speed and torque demand), the powertrain 120 may be active and the powertrain 120 torque may be adjusted and applied, the braking mechanisms 114 may be applied to any wheels 126 having a wheel slip 138, and steering (e.g., via a steering mechanism 108) may be applied to control rotation of the vehicle 104.

According to an exemplary embodiment, the third mode of operation may be activated a wheel speed difference between one or more front axles 132 and one or more rear axles 134 is greater than a threshold value, a vehicle 104 speed is less than the threshold vehicle 104 speed value for the first mode of operation, and an absolute value of a yaw rate of the vehicle 104 is greater than a threshold yaw rate value.

Figures 4, 5:
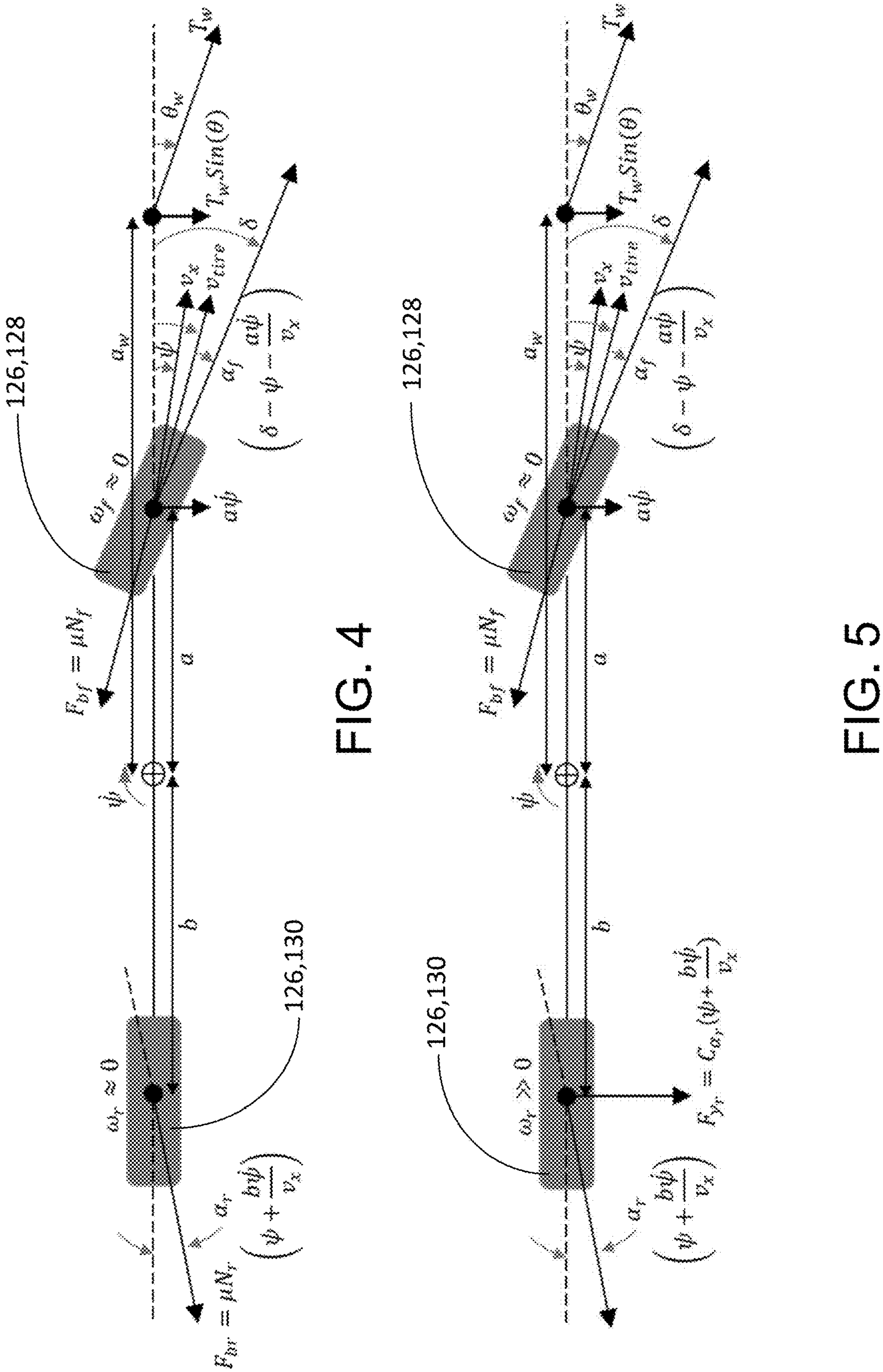
FIG. 4, illustrates a front and rear wheel of a vehicle functioning in accordance with the third mode of transportation according to a scenario when all wheels are locked, according to an exemplary embodiment of the present disclosure.
FIG. 5, illustrates a front and rear wheel of a vehicle functioning in accordance with the third mode of transportation according to a scenario when the front wheels are locked, according to an exemplary embodiment of the present disclosure.

According to an exemplary embodiment, when the winching control system 100 is functioning in accordance with the third mode of operation and all wheels 126 have a wheel slip 138, the braking mechanisms 114 may be applied to all of the wheels 126 (i.e., all of the wheels 126 are locked), the powertrain 120 torque may be disengaged, and steering may be modulated in order to control undesirable yaw motion of the vehicle 104 direct momentum generated by the winch 102 in a desired direction, according to yaw-based dynamic Equation 1, and as shown, e.g., in FIG. 4.

$$I_z\ddot{\psi} + \left(\mu N_r \frac{b^2}{v_x} - \mu N_f \frac{a^2}{v_x}\right)\dot{\psi} + (\mu N_r b - \mu N_f a)\psi + \mu N_f a\delta - T_w\theta_w a_w = 0 \qquad \text{Equation 1}$$

According to an exemplary embodiment, when the winching control system 100 is functioning in accordance with the third mode of operation and the front wheels 128 have a wheel slip 138, the braking mechanisms 114 may be applied to the front wheels 128 (i.e., the front wheels 128 are locked), the front powertrain 122 torque may be disengaged, and steering may be modulated to control undesirable yaw motion of the vehicle and direct momentum generated by the winch 102 and the rear powertrain 124 in a desired direction, according to yaw-based dynamic Equation 2, and as shown, e.g., in FIG. 5.

$$I_z\ddot{\psi} + \left(C_{\alpha_r} \frac{b^2}{v_x} - \mu N_f \frac{a^2}{v_x}\right)\dot{\psi} + (C_{\alpha_r} b - \mu N_f a)\psi + \mu N_f a\delta - T_w\theta_w a_w = 0 \qquad \text{Equation 2}$$

Figure 6:
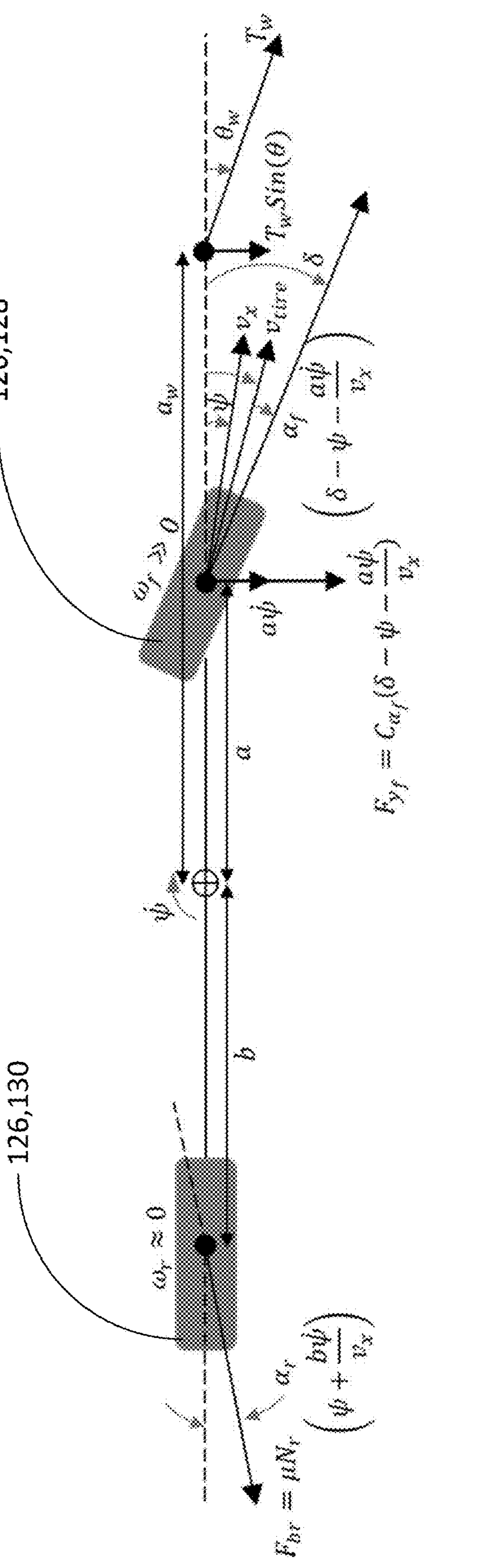
FIG. 6, illustrates a front and rear wheel of a vehicle functioning in accordance with the third mode of transportation according to a scenario when the rear wheels are locked, according to an exemplary embodiment of the present disclosure.

According to an exemplary embodiment, when the winching control system 100 functioning in accordance with the third mode of operation and the rear wheels 130 have a wheel slip 138, the braking mechanisms 114 may be applied to the rear wheels 130 (i.e., the rear wheels 130 are locked), the rear powertrain 124 torque may be disengaged, and steering may be modulated to control undesirable yaw motion of the vehicle 104 and direct momentum generated by the winch 102 and front powertrain 122 in a desired direction, according to yaw-based dynamic Equation 3, and as shown, e.g., in FIG. 6.

$$I_z\ddot{\psi} + \left(C_{\alpha_f} \frac{a^2}{v_x} + \mu N_f \frac{b^2}{v_x}\right)\dot{\psi} + \left(C_{\alpha_f} a - \mu N_r b\right)\psi + C_{\alpha_f} a\delta - T_w\theta_w a_w = 0 \qquad \text{Equation 3}$$

According to Equation 1, Equation 2, and Equation 3, $I_z$=Moment of inertia around z-axis, [kg·m$^2$], $\psi$=Vehicle yaw angle, [rad], $C_{\alpha_r}$=Rear axle cornering stiffness, [N/rad], $v_x$=Vehicle longitudinal velocity, [m/s], $\omega_f, \omega_r$=Wheel rotational velocity, front & rear, [rad/s], $\mu$=Surface friction coefficient, [-], $N_f, N_r$=Axle normal force, front & rear [N], $T_w$=Winch line tension, [N], $\theta_w$=Winch line angle, [rad], a=Longitudinal distance between front axle and CG, [m], b=Longitudinal distance between rear axle and CG, [m], $a_w$=Longitudinal distance between winch and CG, [m], and $\delta$=Steering wheel angle, [rad].

Figure 7:
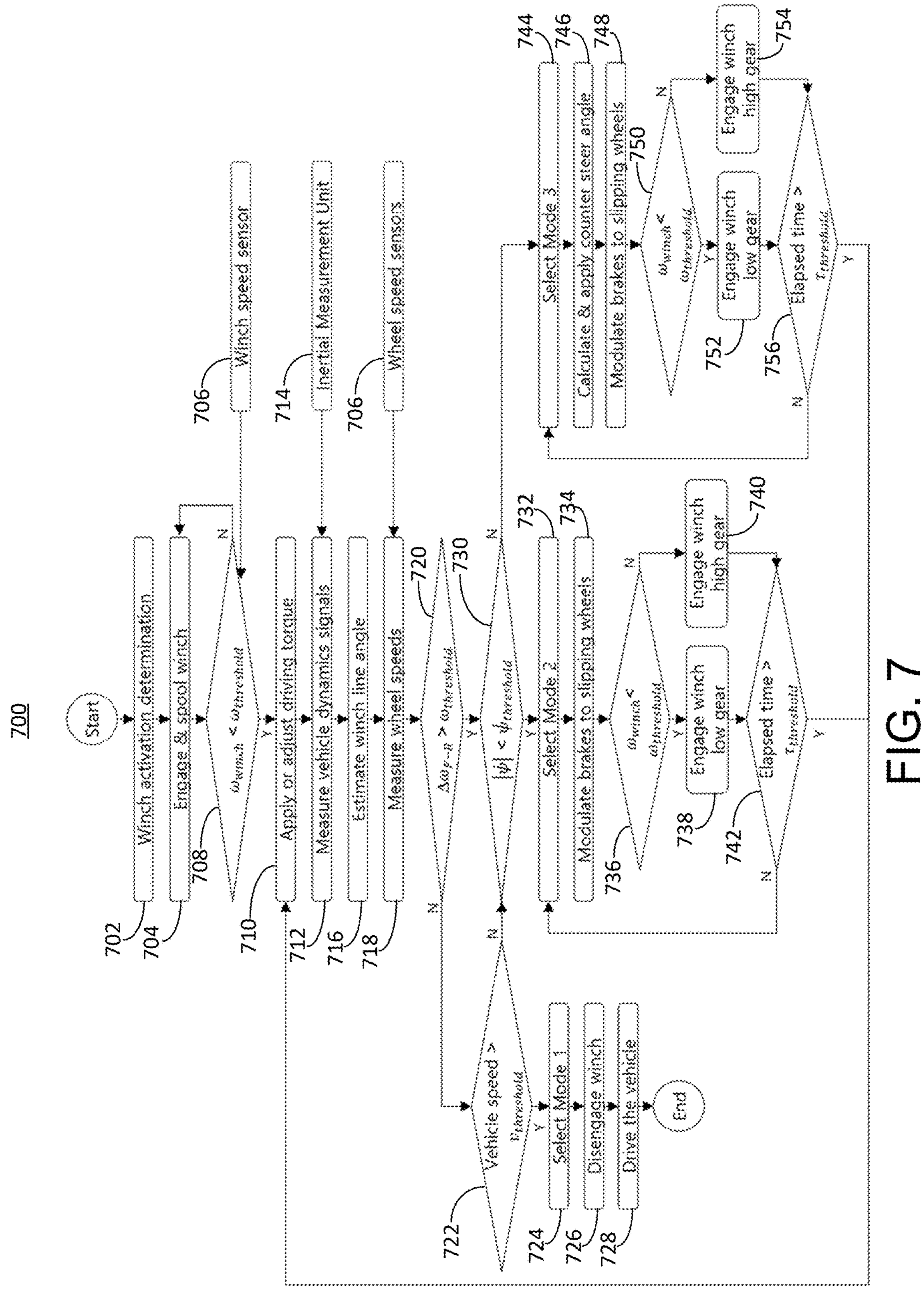
FIG. 7, illustrates a method for controlling a winching control system, according to an exemplary embodiment of the present disclosure.

Referring now to FIG. 7, a method 700 for controlling a winching control system is illustratively depicted, in accordance with an exemplary embodiment of the present disclosure.

At 702, the computing device may be configured to determine which winch mode of operation (e.g., the first mode of operation, second mode of operation, and third mode of operation) may be activated. According to an exemplary embodiment, after the mode of operation is determined, the winch, at 704, may be engaged and the winching cable may be spooled. According to an exemplary embodiment, the rotational velocity of the winch, $\omega_{winch}$, may be measured using one or more winch speed sensors 706.

At 708, the rotational velocity of the winch, $\omega_{winch}$, may be compared against a threshold rotational velocity, $\omega_{threshold}$, to determine whether the rotational velocity of the winch, $\omega_{winch}$, is less than the threshold rotational velocity, $\omega_{threshold}$. According to an exemplary embodiment, when the rotational velocity of the winch, $\omega_{winch}$, is not less than the threshold rotational velocity, $\omega_{threshold}$, then, at 704, the winch may continue to be spooled.

According to an exemplary embodiment, when the rotational velocity of the winch, $\omega_{winch}$, is less than the threshold rotational velocity, $\omega_{threshold}$, then, at 710, the driving torque may be applied and/or adjusted.

At 712, one or more vehicle dynamics signals may be measured. The one or more vehicle dynamics signals may be received via one or more inertial measurement unit sensors 714. Using the one or more vehicle dynamics signals, a winch line angle may be estimated, at 716.

According to an exemplary embodiment, after the winch line angle is estimated, the wheel speeds, at 718, may be measured using the one or more wheel speed sensors 706, to determine the difference in rotational velocity between the front wheels and the rear wheels, $\omega_{F-R}$.

At 720, the difference in rotational velocity between the front wheels and the rear wheels, $\omega_{F-R}$, may be compared against a threshold rotational velocity, $\omega_{threshold}$, to determine whether the difference in rotational velocity between the front wheels and the rear wheels, $\omega_{F-R}$, is greater than the threshold rotational velocity, $\omega_{threshold}$.

According to an exemplary embodiment, when the difference in rotational velocity between the front wheels and the rear wheels. $\omega_{F-R}$, is not greater than the threshold rotational velocity, $\omega_{threshold}$, then, at 722, it is determined whether a vehicle speed is greater than a threshold speed, $v_{threshold}$.

When the vehicle speed is greater than the threshold speed, $v_{threshold}$, then, at 724, the first mode of operation is selected, the winch, at 726, is disengaged, and the vehicle, at 728, is driven.

When the vehicle speed is not greater than the threshold speed, $v_{threshold}$, then, at 730, it is determined whether the absolute value of the vehicle yaw angle, $|\dot{\psi}|$, is less than a threshold yaw angle, $\dot{\psi}_{threshold}$.

According to an exemplary embodiment, when the difference in rotational velocity between the front wheels and the rear wheels, $\omega_{F-R}$, is greater than the threshold rotational velocity, $\omega_{threshold}$, then, at 730, it is determined whether the absolute value of the vehicle yaw angle, $|\dot{\psi}|$, is less than the threshold yaw angle, $\dot{\psi}_{threshold}$.

According to an exemplary embodiment, when the absolute value of the vehicle yaw angle, $|\dot{\psi}|$, is less than the threshold yaw angle, $\dot{\psi}_{threshold}$, then, at 732, the second mode of operation is selected and, at 734, the braking mechanisms are modulated to any wheels having a wheel slip. Then, at 736, the rotational velocity of the winch, $\omega_{winch}$, may be compared against a threshold rotational velocity, $\omega_{threshold}$, to determine whether the rotational velocity of the winch, $\omega_{winch}$, is less than the threshold rotational velocity, $\omega_{threshold}$.

According to an exemplary embodiment, when the rotational velocity of the winch, $\omega_{winch}$, is less than the threshold rotational velocity, $\omega_{threshold}$, then, at 738, the winch may be engaged at low gear and, at 742, an elapsed time may be compared against a threshold time duration, $\tau_{threshold}$, to determine whether the elapsed time is greater than the threshold time duration, $\tau_{threshold}$.

According to an exemplary embodiment, when the rotational velocity of the winch, (winch, is not less than the threshold rotational velocity, $\omega_{threshold}$, then, at 740, the winch may be engaged at high gear and, at 742, an elapsed time may be compared against the threshold time duration, $\tau_{threshold}$, to determine whether the elapsed time is greater than the threshold time duration, $\tau_{threshold}$.

According to an exemplary embodiment, when the elapsed time is not greater than the threshold time duration, $\tau_{threshold}$, then, at 732, the second mode of operation is maintained. According to an exemplary embodiment, when the elapsed time is greater than the threshold time duration, τthreshold, then, at 710, the driving torque is applied and/or adjusted.

According to an exemplary embodiment, when the absolute value of the vehicle yaw angle, $|\dot{\psi}|$, is not less than the threshold yaw angle, $\dot{\psi}_{threshold}$, then, at 744, the third mode of operation is selected and, at 746, a counter steer angle may be calculated and applied. At 748, the braking mechanisms may be modulated to any wheels having a wheel slip. Then, at 750, the rotational velocity of the winch, $\omega_{winch}$, may be compared against a threshold rotational velocity, $\omega_{threshold}$, to determine whether the rotational velocity of the winch, $\omega_{winch}$, is less than the threshold rotational velocity, $\omega_{threshold}$.

According to an exemplary embodiment, when the rotational velocity of the winch, $\omega_{winch}$, is less than the threshold rotational velocity, $\omega_{threshold}$, then, at 752, the winch may be engaged at low gear and, at 756, an elapsed time may be compared against a threshold time duration, $\tau_{threshold}$, to determine whether the elapsed time is greater than the threshold time duration, $\tau_{threshold}$.

According to an exemplary embodiment, when the rotational velocity of the winch, $\omega_{winch}$, is not less than the threshold rotational velocity, $\omega_{threshold}$, then, at 754, the winch may be engaged at high gear and, at 756, an elapsed time may be compared against the threshold time duration, $\tau_{threshold}$, to determine whether the elapsed time is greater than the threshold time duration, $\tau_{threshold}$.

According to an exemplary embodiment, when the elapsed time is not greater than the threshold time duration. $\tau_{threshold}$, then, at 744, the third mode of operation is maintained. According to an exemplary embodiment, when the elapsed time is greater than the threshold time duration. $\tau_{threshold}$, then, at 710, the driving torque is applied and/or adjusted.

Figure 8:
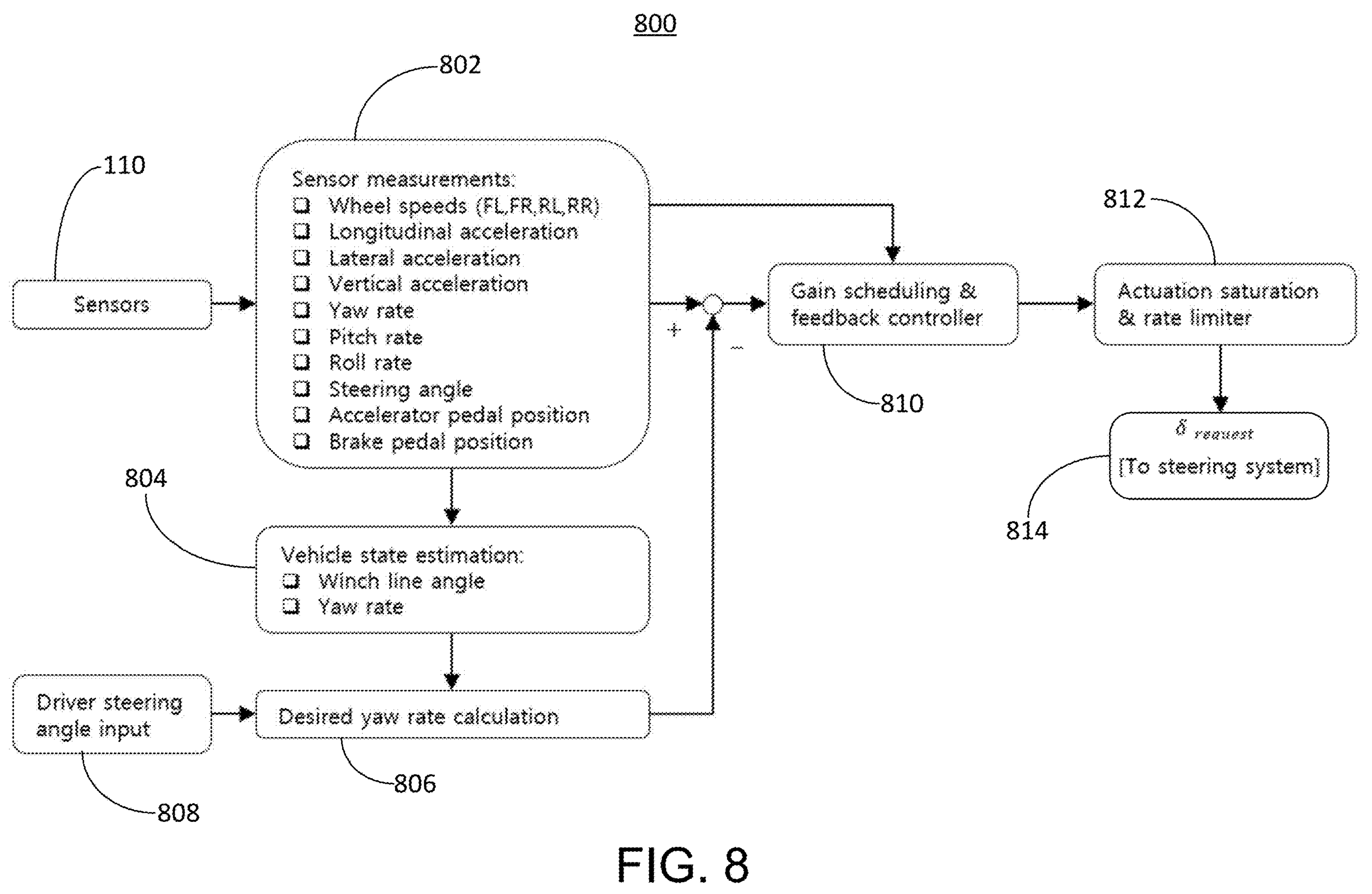
FIG. 8 illustrates a steering control schematic, according to an exemplary embodiment of the present disclosure.

Referring now to FIG. 8, a steering control schematic 800 is illustratively depicted, in accordance with an exemplary embodiment of the present disclosure.

According to an exemplary embodiment, the one or more sensors 110 may be configured to take one or more sensor measurements 802. The one or more sensor measurements 802 may comprise one or more wheel speed measurements for one or more of the wheels 126, one or more longitudinal acceleration measurements, one or more lateral acceleration measurements, one or more vertical acceleration measurements, one or more yaw rate measurements, one or more pitch rate measurements, one or more roll rate measurements, one or more steering angle measurements, one or more accelerator pedal position measurements, one or more brake pedal position measurements, and/or one or more other suitable measurements.

The one or more sensors measurements 802 may be used by a vehicle state estimation generator 804 to generate a vehicle 104 state estimation. The vehicle 104 state estimation may comprise a winch line angle, a yaw rate, and/or other suitable vehicle 104 state estimation.

The vehicle 104 state estimation and a driver steering angle input 808 may be used by a desire yaw rate calculator 806 to generate a desired yaw rate calculation.

According to an exemplary embodiment, the desired yaw rate calculation and the one or more sensor measurements 802 may be used by a gain scheduling and feedback controller 810 configured to perform gain scheduling and feedback, which may then be used by an actuation saturation and rate limiter 812 to generate a steering wheel request angle, $\delta_{request}$, to send to the steering system 108 to adjust the steering wheel angle.

Figure 9:
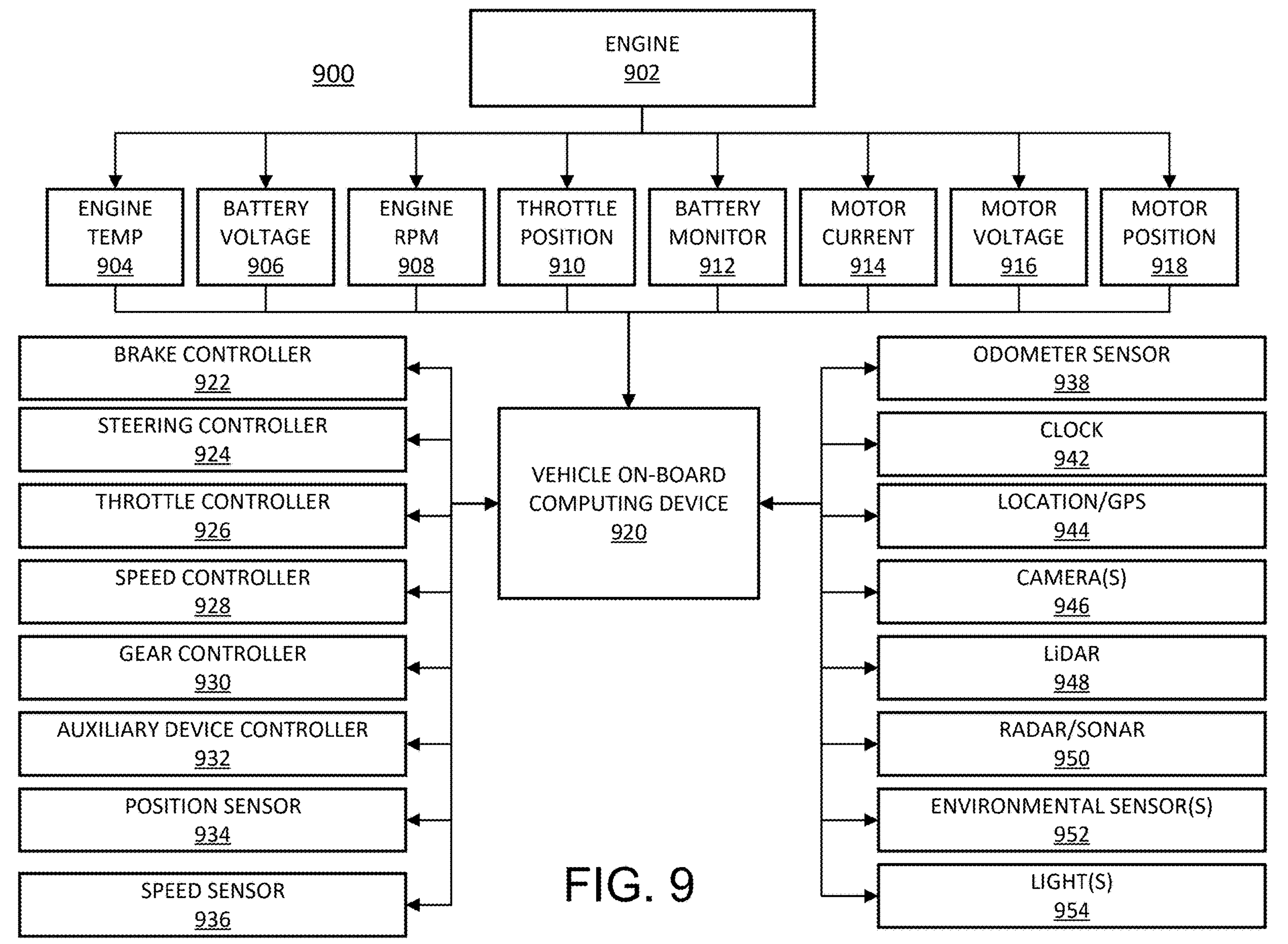
FIG. 9 illustrates an example architecture of a vehicle, according to an exemplary embodiment of the present disclosure.

Referring now to FIG. 9, an example vehicle system architecture 900 for a vehicle is provided, in accordance with an exemplary embodiment of the present disclosure. The following discussion of vehicle system architecture 900 is sufficient for understanding one or more components of vehicle 104.

As shown in FIG. 9, the vehicle system architecture 900 may comprise an engine, motor or propulsive device 902 and various sensors 904-918 for measuring various parameters of the vehicle system architecture 900. In gas-powered or hybrid vehicles having a fuel-powered engine, the sensors 904-918 may comprise, for example, an engine temperature sensor 904, a battery voltage sensor 906, an engine Rotations Per Minute (RPM) sensor 908, and/or a throttle position sensor 910. If the vehicle is an electric or hybrid vehicle, then the vehicle may comprise an electric motor, and accordingly may comprise sensors such as a battery monitoring system 912 (to measure current, voltage and/or temperature of the battery), motor current 914 and voltage 916 sensors, and motor position sensors such as resolvers and encoders 918.

Operational parameter sensors that are common to both types of vehicles may comprise, for example: a position sensor 934 such as an accelerometer, gyroscope and/or inertial measurement unit; a speed sensor 936; and/or an odometer sensor 938. The vehicle system architecture 900 also may comprise a clock 942 that the system uses to determine vehicle time and/or date during operation. The clock 942 may be encoded into the vehicle on-board computing device 920, it may be a separate device, or multiple clocks may be available.

The vehicle system architecture 900 also may comprise various sensors that operate to gather information about the environment in which the vehicle is traveling. These sensors may comprise, for example: a location sensor 944 (for example, a Global Positioning System (GPS) device); object detection sensors such as one or more cameras 946; a LiDAR sensor system 948; and/or a RADAR and/or a sonar system 950. The sensors also may comprise environmental sensors 952 such as, e.g., a humidity sensor, a precipitation sensor, a light sensor, and/or ambient temperature sensor. The object detection sensors may be configured to enable the vehicle system architecture 900 to detect objects that are within a given distance range of the vehicle in any direction, while the environmental sensors 952 may be configured to collect data about environmental conditions within the vehicle's area of travel. According to an exemplary embodiment, the vehicle system architecture 900 may comprise one or more lights 954 (e.g., headlights, flood lights, flashlights, etc.).

During operations, information may be communicated from the sensors to an on-board computing device 920 (e.g., computing device 106, computing device 1000). The on-board computing device 920 may be configured to analyze the data captured by the sensors and/or data received from data providers and may be configured to optionally control operations of the vehicle system architecture 900 based on results of the analysis. For example, the on-board computing device 920 may be configured to control: braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers. The brake controller 922 may comprise a pedal effort sensor, pedal effort sensor, and/or simulator temperature sensor, as described herein.

Geographic location information may be communicated from the location sensor 944 to the on-board computing device 920, which may then access a map of the environment that corresponds to the location information to determine known fixed features of the environment such as streets, buildings, stop signs and/or stop/go signals. Captured images from the cameras 946 and/or object detection information captured from sensors such as LiDAR 948 may be communicated from those sensors to the on-board computing device 920. The object detection information and/or captured images may be processed by the on-board computing device 920 to detect objects in proximity to the vehicle. Any known or to be known technique for making an object detection based on sensor data and/or captured images may be used in the embodiments disclosed in this document.

Figure 10:
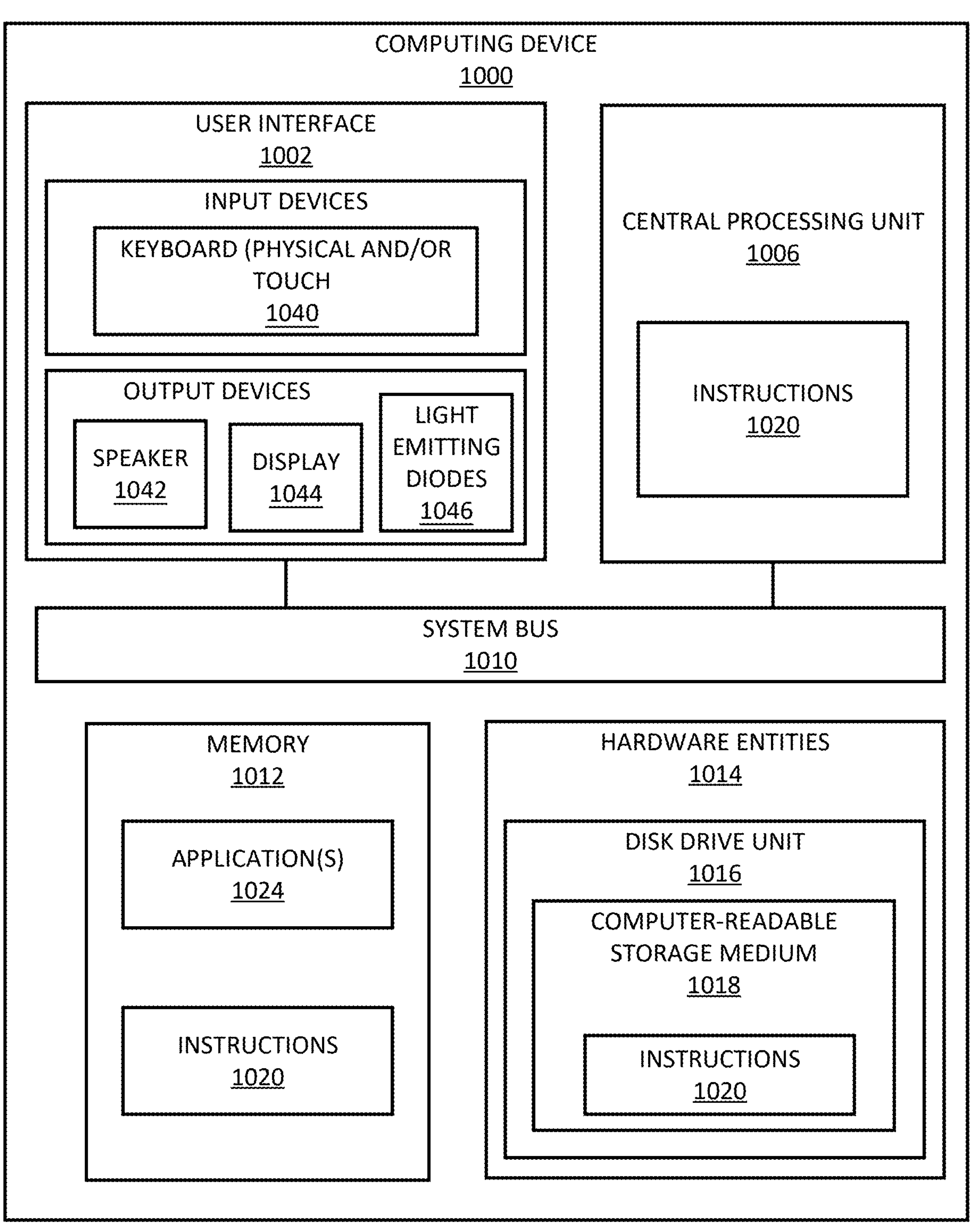
FIG. 10 illustrates example elements of a computing device, according to an exemplary embodiment of the present disclosure.

Referring now to FIG. 10, an illustration of an example architecture for a computing device 1000 is provided. According to an exemplary embodiment, one or more functions of the present disclosure may be implemented by a computing device such as, e.g., computing device 1000 or a computing device similar to computing device 1000. Computing device 1000 may be a quantum computer, a classical computer, and/or have one or more components configured to perform one or more quantum and/or classical computing functions. Computing device 106 may be an example of computing device 1000 and/or may comprise one or more components of computing device 1000.

The hardware architecture of FIG. 10 represents one example implementation of a representative computing device configured to implement at least a portion of the systems (e.g., winching control system 100 and steering control schematic 800) and method(s)/control logic(s) (e.g., method 700) described herein.

Some or all components of the computing device 1000 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 10, the computing device 1000 may comprise a user interface 1002 (e.g., a graphical user interface), a Central Processing Unit ("CPU") 1006, a system bus 1010, a memory 1012 connected to and accessible by other portions of computing device 1000 through system bus 1010, and hardware entities 1014 connected to system bus 1010. The user interface may comprise input devices and output devices, which may be configured to facilitate user-software interactions for controlling operations of the computing device 1000. The input devices may comprise, but are not limited to, a physical and/or touch keyboard 1040. The input devices may be connected to the computing device 1000 via a wired or wireless connection (e.g., a Bluetooth® connection). The output devices may comprise, but are not limited to, a speaker 1042, a display 1044, and/or light emitting diodes 1046.

At least some of the hardware entities 1014 may be configured to perform actions involving access to and use of memory 1012, which may be a Random Access Memory (RAM), a disk driver and/or a Compact Disc Read Only Memory (CD-ROM), among other suitable memory types. Hardware entities 1014 may comprise a disk drive unit 1016 comprising a computer-readable storage medium 1018 on which may be stored one or more sets of instructions 1020 (e.g., programming instructions such as, but not limited to, software code) configured to implement one or more of the methodologies, procedures, or functions described herein. The instructions 1020 may also reside, completely or at least partially, within the memory 1012 and/or within the CPU 1006 during execution thereof by the computing device 1000.

The memory 1012 and the CPU 1006 may also constitute machine-readable media. The term "machine-readable media", as used here, refers to a single medium or multiple media (e.g., a centralized or distributed database, and/or associated caches and servers) that store the one or more sets of instructions 1020. The term "machine-readable media", as used here, also refers to any medium that is capable of storing, encoding, or carrying a set of instructions 1020 for execution by the computing device 1000 and that cause the computing device 1000 to perform any one or more of the methodologies of the present disclosure. According to various embodiments, one or more computer applications 1024 may be stored on the memory 1012.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including." "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A winching control system, comprising:

a vehicle, comprising:
- one or more front wheels and one or more rear wheels;
- one or more front axles and one or more rear axles;
- one or more powertrains;
- one or more braking mechanisms; and
- a steering mechanism;

a winch, coupled to the vehicle, comprising a winching cable;

a computing device, comprising a processor and a memory; and one or more sensors configured to determine whether any of the one or more front wheels and one of more rear wheels have a wheel slip;

wherein the memory comprises instructions that, when executed by the processor, are configured to cause the processor to:
- control the vehicle and the winch, and
- cause the winching control system function between a first mode of operation, a second mode of operation, and a third mode of operation;

wherein, in the second m e of operation:
- the winch is activated with a winch gear engaged;
- the one or more powertrains are activated, and
- the one or more braking mechanisms are applied to any wheels having a wheel slip; and wherein the instructions, when executed by the processor, are further configured to cause the processor to activate the second mode of operation in response to:
- a wheel speed difference between the one or more front axles and the one or more rear axles being greater than a threshold value;
- a vehicle speed being less than a threshold vehicle speed; and
- an absolute value of a yaw rate of the vehicle being less than a threshold yaw rate value.

2. The winching control system of claim 1, wherein, in the first mode of operation:
- the winch is deactivated; and
- the vehicle is configured to be driven by the one or more powertrains.

3. The winching control system of claim 2, wherein the instructions, when executed by the processor, are further configured to cause the processor to activate the first mode of operation when:
- a wheel speed difference between the one or more front axles and the one or more rear axles is less than a threshold value; and
- a vehicle speed is greater than a threshold vehicle speed.

4. The winching control system of claim 1, wherein:

in the second mode of operation, the instructions, when executed by the processor, are further configured to cause the processor to adjust a torque of the one or more powertrains, and the adjusting the torque of the one or more powertrains comprises:

determining, using the computing device, whether a rotational velocity of the winch is less than a threshold rotational velocity;

when the rotational velocity of the winch is less than the threshold rotational velocity, engaging the winch at a low gear; and when the rotational velocity of the vehicle is not less than the threshold rotational velocity, engaging the winch at a high gear.

5. The winching control system of claim 1, wherein, in the third mode of operation:

the winch is activated with a winch gear engaged;

the one or more powertrains are activated;

the one or more braking mechanisms are applied to any wheels having a wheel slip; and the steering mechanism are activated to control rotation of the vehicle.

6. The winching control system of claim 5, wherein:

in the third mode of operation, the instructions, when executed by the processor, are further configured to cause the processor to adjust a torque of the one or more powertrains, and the adjusting the torque of the one or more powertrains comprises:

determining, using the computing device, whether a rotational velocity of the winch is less than a threshold rotational velocity;

when the rotational velocity of the winch is less than the threshold rotational velocity, engaging the winch at a low gear; and when the rotational velocity of the vehicle is not less than the threshold rotational velocity, engaging the winch at a high gear.

7. The winching control system of claim 5, wherein the instructions, when executed by the processor, are further configured to cause the processor to activate the third mode of operation in response to:

a wheel speed difference between the one or more front axles and the one or more rear axles being greater than a threshold value;

a vehicle speed being less than a threshold vehicle speed; and an absolute value of a yaw rate of the vehicle being greater than a threshold yaw rate value.

8. A method for controlling a winching control system, comprising:

using a computing device, comprising a processor and a memory:

controlling one or more functions of a vehicle and a winch of a winching control system, wherein:

the vehicle comprises:

one or more front wheels and one or more rear wheels;

one or more front axles and one or more rear axles;

one or more powertrains;

one or more braking mechanisms; and a steering mechanism, and the winch is coupled to the vehicle and comprises a winching cable;

causing the winching control system function between a first mode of operation, a second mode of operation, and a third mode of operation; and determining, using one or more sensors, whether any of the one or more front wheels and one or more rear wheels have a wheel slip; and wherein, in the second mode of operation:

the winch is activated with a winch gear engaged;

the one or more powertrains are activated; and the one or more braking mechanisms are applied to any wheels having a wheel slip; and wherein the method further comprises, using the computing device, activating the second mode of operation in response to:

a wheel speed difference between the one or more front axles and the one or more rear axles being greater than a threshold value;

a vehicle speed being less than a threshold vehicle speed; and an absolute value of a yaw rate of the vehicle being less than a threshold yaw rate value.

9. The method of claim 8, wherein, in the first mode of operation:

the winch is deactivated; and the vehicle is configured to be driven by the one or more powertrains.

10. The method of claim 9, further comprising, using the computing device, activating the first mode of operation when:

a wheel speed difference between the one or more front axles and the one or more rear axles is less than a threshold value; and a vehicle speed is greater than a threshold vehicle speed.

11. The method of claim 8, further comprising, in the second mode of operation, using the computing device, adjusting a torque of the one or more powertrains, wherein the adjusting the torque of the one or more powertrains comprises:

determining, using the computing device, whether a rotational velocity of the winch is less than a threshold rotational velocity;

when the rotational velocity of the winch is less than the threshold rotational velocity, engaging the winch at a low gear; and when the rotational velocity of the vehicle is not less than the threshold rotational velocity, engaging the winch at a high gear.

12. The method of claim 8, wherein, in the third mode of operation:

the winch is activated with a winch gear engaged;

the one or more powertrains are activated;

the one or more braking mechanisms are applied to any wheels having a wheel slip; and the steering mechanism are activated to control rotation of the vehicle.

13. The method of claim 12, further comprising, in the third mode of operation, using the computing device, adjusting a torque of the one or more powertrains, wherein the adjusting the torque of the one or more powertrains comprises:

determining, using the computing device, whether a rotational velocity of the winch is less than a threshold rotational velocity;

when the rotational velocity of the winch is less than the threshold rotational velocity, engaging the winch at a low gear; and when the rotational velocity of the vehicle is not less than the threshold rotational velocity, engaging the winch at a high gear.

14. The method of claim 12, further comprising, using the computing device, activating the third mode of operation in response to:

a wheel speed difference between the one or more front axles and the one or more rear axles being greater than a threshold value;

a vehicle speed being less than a threshold vehicle speed; and an absolute value of a yaw rate of the vehicle being greater than a threshold yaw rate value.

* * * * *